(Model.)

C. H. PERKINS, C. STREHORN & P. DIXON.
Flue Expander.

No. 233,797.  Patented Oct. 26, 1880.

WITNESSES:
Jas. E. Hutchinson.
Henry C. Hazard.

INVENTORS.
C. H. Perkins, C. Strehorn
P. Dixon, by
Geo. S. Prindle, their Atty

UNITED STATES PATENT OFFICE.

CHARLES H. PERKINS, CHARLES STREHORN, AND PATRICK DIXON, OF BLOOMINGTON, ILLINOIS.

FLUE-EXPANDER.

SPECIFICATION forming part of Letters Patent No. 233,797, dated October 26, 1880.

Application filed May 18, 1880. (Model.)

*To all whom it may concern:*

Be it known that we, CHAS. H. PERKINS, C. STREHORN, and P. DIXON, of Bloomington, in the county of McLean, and in the State of Illinois, have invented certain new and useful Improvements in Flue-Expanders; and we do hereby declare that the following is a full, clear, and exact description thereof, reference being had to the accompanying drawings, making a part of this specification, in which—

Figure 1:
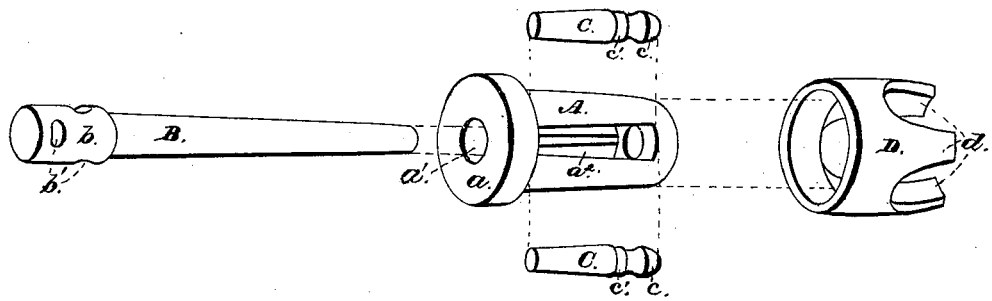
Figure 2:
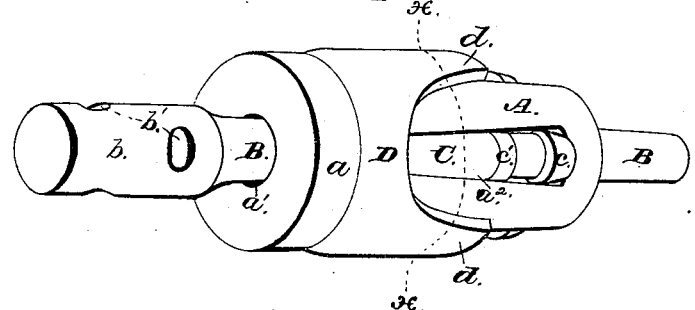
Figure 3:
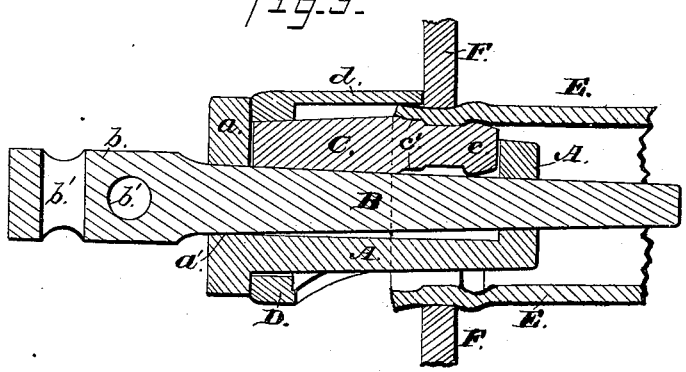
Figure 4:
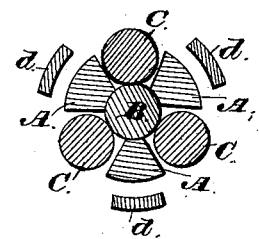

Figure 1 is a perspective view of the parts of our device separated from each other. Fig. 2 is a like view of the same as combined for use. Fig. 3 is a central longitudinal section of said device as applied to a flue, and Fig. 4 is a cross-section upon line $x\ x$ of Fig. 2.

Letters of like name and kind refer to like parts in each of the figures.

The design of our invention is to enable flues to be easily and securely fastened within a flue-sheet by expanding the former at each side of the latter; and to this end it consists, principally, in a flue-expander in which a series of tapering rollers are journaled at equidistant points around an oppositely-tapering mandrel and adapted to be rolled around the interior of a flue and to be moved radially outward by the circumferential and longitudinal movement of said mandrel, substantially as and for the purpose hereinafter specified.

It consists, further, in the peculiar form of the rollers, substantially as and for the purpose hereinafter shown.

It consists, further, in the combination of the expanding-rollers, the cage or frame, and the tapering central mandrel, substantially as and for the purpose hereinafter shown and described.

It consists, finally, in the device as a whole, its several parts being combined to operate substantially as and for the purpose hereinafter shown.

In the annexed drawings, A represents a cage, having exteriorly a round tapering form, and provided at its largest end with a flange or head, $a$, that has a considerably greater diameter than has the said body.

Within the cage A is an axial opening, $a'$, which has a round form in cross-section and longitudinally tapers to correspond with the conformation of the exterior of said cage. At equidistant points within the body of said cage are provided three radial openings, $a^2$, each of which extends from the head $a$ to a point about one-half inch from the opposite end of said body, and has regularly-decreasing width from the latter point to its opposite end at said head.

Within the axial opening $a'$ of the cage A is fitted a mandrel, B, that corresponds exteriorly to the shape and size of the same, and at its rear end is provided with a head, $b$, that has radial openings $b'$ for the insertion of an operating-bar.

Within each opening $a^2$ is placed a roller, C, which has such length and transverse dimensions as to cause it to loosely fill said opening, said roller being tapered longitudinally to correspond to the shape of the latter. Near the front end each of said rollers is recessed out, so as to leave at said end a rounded head, $c$, and at the rear end of said recess is provided an outward and rearward sloping shoulder, $c'$, as shown.

Upon the rear portion of the body of the cage A, adjacent to the head $a$, is loosely fitted a ring, D, which is provided with three or more fingers, $d$, that extend forward to a point substantially upon a line radially with the shoulders $c'$ of the rollers C, and are relatively arranged so as to enable them to be passed freely over the end of the tube or flue E to be operated upon.

The device is now complete and is used as follows, viz: The mandrel B is withdrawn until the rollers C can be pressed inward sufficiently to permit of the insertion of the front end of the cage, with said rollers, into the flue E, with the gage D fitting over the end of said flue and bearing against the flue-sheet F. The mandrel B is now pressed inward until the rollers C are caused to bear firmly against the interior of the flue E, after which said mandrel is rotated by means of a bar passed through the openings $b'$ within its head $b$. As the mandrel B forms the inner bearing of the rollers C, the rotation of the former will cause the latter to roll around the interior of the flue E, the cage A being moved with or by said rollers. At each revolution of the mandrel B it is driven inward, so as to cause a constant outward pressure upon the rollers C, while by means of such outward pressure and the rolling movement of the latter the heads $c$ and shoulders $c'$ gradually force the metal of the flue E outward, as shown in Fig. 3, upon each side of the flue-sheet F and cause said flue to be firmly engaged with said sheet. The expansion of the flue E by means of the rollers C is more easy and gradual, less injury is done to the metal, and a closer joint is secured between said flue and the sheet F than could otherwise be the case.

The gage D performs the double office of depthing the rollers and of a bearing for and within which the cage A revolves.

We are aware that tube-expanders have before been used in which a series of rollers were arranged to roll around the interior of a tube and were moved radially by means of a tappering mandrel, and do not claim such construction broadly.

Having thus fully set forth the nature and merits of our invention, what we claim as new is—

1. A flue-expander in which a series of tapering rollers are journaled at equidistant points around an oppositely-tapering mandrel and adapted to be rolled around the interior of a flue, and to be moved radially outward by the circumferential and longitudinal movement of said mandrel, substantially as and for the purpose specified.

2. The rollers C, having a tapering form and each provided with a rounded head, $c$, and sloping shoulder $c'$, substantially as and for the purpose shown.

3. The combination of the cage A, provided with the axial tapering opening $a'$ and radial tapering opening $a^2$, the tapering mandrel B, and the rollers C, made tapering longitudinally, and each provided with a rounded head, $c$, and sloping shoulders $c'$, substantially as and for the purpose shown and described.

4. The hereinbefore-described device, in which are combined the cage A, provided with the head $a$, tapering axial opening $a'$, and radial openings $a^2$, the tapering mandrel B, having the head $b$ and openings $b'$, the tapering rollers C, provided each with a rounded head, $c$, and sloping shoulder $c'$, and the gage D $d$, substantially as and for the purpose shown.

In testimony that we claim the foregoing we have hereunto set our hands this 11th day of May, 1880.

CHARLES HENRY PERKINS.
CHARLES STREHORN.
PATRICK DIXON.

Witnesses:
A. T. LAWRENCE,
J. P. PERKINS.